United States Patent [19]
Metz

[11] 3,810,603
[45] May 14, 1974

[54] BUMPER JACK

[76] Inventor: Anthony B. Metz, 129 Chester Ave., Chelsea, Mass. 02150

[22] Filed: June 9, 1972

[21] Appl. No.: 261,155

[52] U.S. Cl.............................. 254/100, 254/133
[51] Int. Cl................................................ B66f 3/08
[58] Field of Search............. 254/100, 133, 134, 45, 254/86 R, 93 VA, 93 H

[56] References Cited
UNITED STATES PATENTS

| | | | |
|---|---|---|---|
| 2,590,970 | 4/1952 | Jensen | 254/100 |
| 2,554,910 | 5/1951 | Jensen | 254/100 |
| 2,544,039 | 3/1951 | Pearne | 254/93 H |

Primary Examiner—Al Lawrence Smith
Assistant Examiner—Robert C. Watson

[57] ABSTRACT

A bumper jack is disclosed that consists of a holder through which an elongated supporting screw is threaded. The jack requires that bumpers have fore and aft opening ports and the holder includes a hook portion dimensioned to be inserted inwardly through a port and a stop that is engageable with the outer surface of the bumper when the screw is vertically disposed then to cooperate with the hook in connecting the jack positively to the bumper while the jack is in service.

4 Claims, 4 Drawing Figures

PATENTED MAY 14 1974  3,810,603

BUMPER JACK

BACKGROUND OF THE INVENTION

So called "bumper" jacks of the type having a relatively long supporting post have been in use for many years. Unless they are carefully used, however, they may fail to hold the jacked vehicle endangering the user with sometimes fatal injuries resulting.

A bumper jack must raise a wheel indirectly by first raising the frame from one end to an extent such that the wheel is lifted by the associated spring. A bumper jack must accordingly be extended to a far greater degree than is the case when a jack is used that may be positioned under the vehicle to raise a wheel directly. A bumper jack thus becomes a relatively long prop that is unstable due to the fact that the bumper rests on a support carried by the jack in a manner permitting relative movement therebetween.

While bumper jacks offer the convenience that they are easily used since they are located outside the bumpers, the dangers attendant their use are so well recognized that many motorists carry jacks that are much more stable even though, for use, they must be pushed under the vehicle to underlie a part from which it will not slip during use. Bumper jacks are available that have a stable base but these are too bulky to be well accepted.

THE PRESENT INVENTION

The objective of the present invention is to provide both a jack and a bumper and jack combination in which each jack is positively connected to a bumper when in service.

This objective is attained by providing each bumper with at least one fore and aft opening port in a position appropriate for use when the motor vehicle is to be jacked to permit one of its wheels to be removed and replaced. To accomplish this result, each jack has a holder having a threaded bore through which an elongated supporting screw is threaded. The holder has attaching means connectable to the bumper through the appropriate port when in a position in which the bore is not vertical and locking with the bumper to prevent any substantial movement relative thereto when the holder is positioned with the elevating screw approximately vertical.

THE PREFERRED EMBODIMENT OF THE INVENTION

In the accompanying drawings, there is shown a preferred embodiment of the invention of which FIG. 1 is a fragmentary front view of a motor vehicle having a bumper-jack combination in accordance with the invention;

Figure 1:
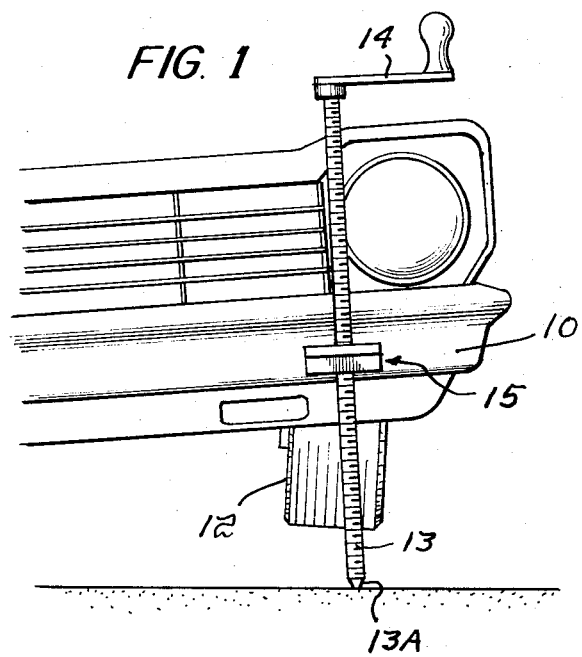
Figure 2:
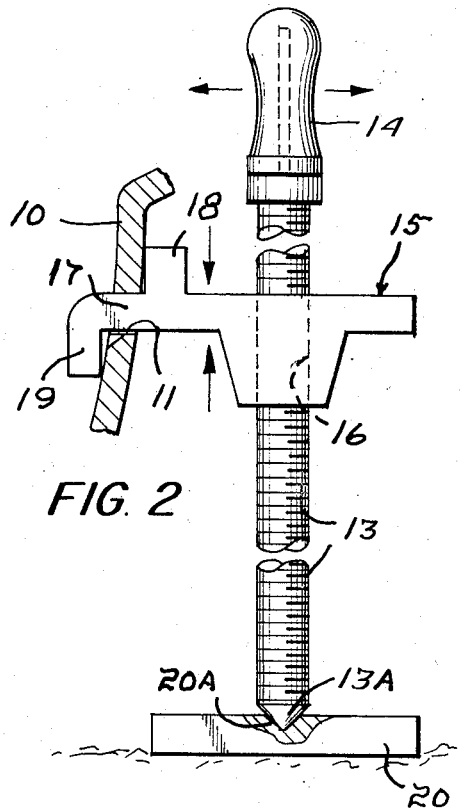
FIG. 2 is a fragmentary vertical section through the bumper showing the jack with the holder caught in the bumper slot and used with a bed plate.
Figure 3:
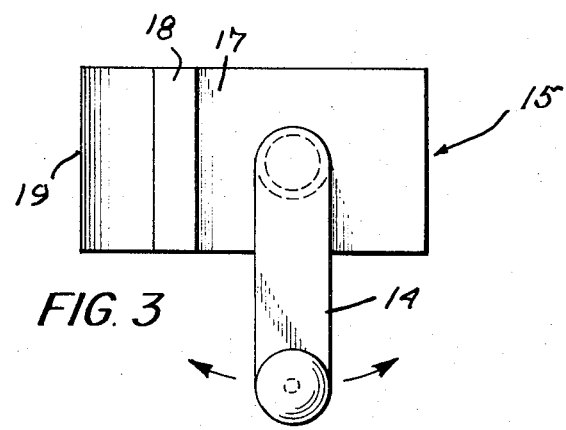
FIG. 3 is a top plan view of the jack.
Figure 4:
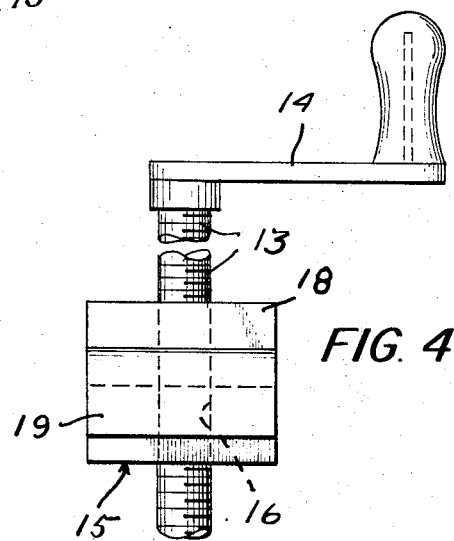
FIG. 4 is a fragmentary front view thereof as seen from the hook end of the holder.

In the preferred embodiment of the invention, an automobile bumper 10 has transverse slots 11 opening inwardly therethrough, each located in a position adjacent a wheel 12 suitable for the connection of a jack thereto when, for example, a tire change is to be made. Only one such slot 11 is shown.

The jack comprises a screw 13 of substantial length having a crank 14 attached to its upper end and a holder generally indicated at 15 having a screw-receiving bore 16 extending vertically therethrough and of substantial thickness thus to ensure adequate thread length to enable the heavy loads to which the jack is to be subjected to be safely handled. The holder 15 also includes a supporting arm 17 having an upwardly disposed stop 18 and, forwardly thereof, of a cross sectional size and shape to be a close fit in the slot 11 with its free end downwardly bent at right angles to provide a hook 19. The proximate faces of the stop and hook are shown as parallel and spaced to receive between them and closely confine portions of the bumper 10 marginally of each slot 11.

The bottom end 13A of the screw 13 is conical and the jack is provided with a bed plate 20 having a central seat 20A to receive and contain the pointed end 13A of the screw. On most pavements, the plate 20 need not be used as the screw 13 forms its own seat therein as the jack lifts the vehicle.

In the use of the jack, the holder 15 is so positioned on its screw 13 that the hook 19 of the holder 15 may be inserted through the appropriate bumper slot 11 with the holder 15 so positioned that the screw is in a non-vertical, non-supporting position. As it is necessary that the stop 18 and the hook 19 closely confine the bumper wall, the bottom of each slot 11 is bevelled as at 21 to permit the passage of the hook 19 therethrough. The arm 17 and the bumper are thus caught together when the holder is so positioned that the jack screw 13 then is approximately vertical. The crank 14 is then turned first to extend the screw 13 to seat against the pavement or in the bed plate 20 and then to lift the vehicle until the appropriate wheel 12 is clear of the ground.

Because the holder 15 and the bumper 10 are positively interconnected when the jack is in service, the jack cannot move from a supporting position thus minimizing any chance of its failure, as a prop, to maintain the vehicle in its jacked position.

I claim:

1. A jack for use with a motor vehicle bumper having a non-circular opening through it in a position appropriate for lifting the proximate wheel from the ground, said jack comprising a holder having a threaded bore, an elongated supporting screw threaded through said bore and having first and second ends, and screw rotating means attached to said first end of said screw, said second end defining means for resting on a support surface, said holder including a rigid arm extending in a direction normal to said screw and provided with an angularly disposed end portion extending generally parallel to said screw and said second end and a stop portion spaced rearwardly of said arm and in the direction opposite to said first end, the arm and the end portion both dimensioned for passage through the opening and with the arm between the stop and the end portion of the cross sectional shape of the opening and dimensioned to be a close fit therein, attachment of the holder to the bumper requiring that the holder be first positioned with its threaded bore axis so inclined that the end portion of the arm may be passed through the opening and the holder then placed with the axis of the threaded bore in substantially the vertical position in which the jack is to be used, the end and stop portions of the arm then extending in opposite vertical directions and the space between them being such that in said vertical position, both portions are substantially in holding engagement with opposite surface portions of the bumper, one above and one below said opening to prevent any substantial movement between the bumper and the screw, and the arm between said end and stop portions preventing tilting of the vehicle relative to the screw.

2. The jack of claim 1 in which the opening is a slot extending transversely of the bumper.

3. The jack of claim 2 in which the end portion and the stop are both of approximately the same length as the slot and their proximate faces are substantially parallel.

4. The jack of claim 1 in which the holder, at least in the zone having the threaded bore, is substantially thicker than the arm.

* * * * *